Patented Nov. 3, 1925.

1,560,045

UNITED STATES PATENT OFFICE.

FREDERICK L. DUNLAP, OF CHICAGO, ILLINOIS, ASSIGNOR TO INDUSTRIAL APPLIANCE COMPANY, OF CHICAGO, ILLINOIS, A CORPORATION OF ILLINOIS.

METHOD OF TREATING FLOUR.

No Drawing. Application filed July 25, 1923. Serial No. 653,819.

*To all whom it may concern:*

Be it known that I, FREDERICK L. DUNLAP, a citizen of the United States, residing at Chicago, in the county of Cook and State of Illinois, have invented certain new and useful Improvements in the Method of Treating Flour, of which the following is a specification.

My invention relates to the treatment of wheat flours and wheat flour doughs, and its object is to provide a novel method of treating flour either before or after it is incorporated with other ingredients in a dough batch to effect certain physico-chemical changes in the gluten whereby in the manufacture of crackers, cookies, and other like bakery products a crispness or brittleness will be given to the products without the use of shortening or with a diminished amount of the same.

To achieve the purpose of the invention the flour in a dry state may be treated, at the flour mill or afterwards, or the dough itself may be treated, or both the dry flour and the dough may be given treatment, the latter in such case, for the purpose of correcting or modifying the effect of the original treatment so as to obtain in the finished bakery product the particular characteristics desired. In claiming the invention as a method of treating flour it will be understood that I contemplate treatment in accordance with any one of the foregoing procedures.

It has been recognized for some time that the control of the intensity of acidity (hydrogen ion concentration) of a yeast leavened bread dough is an important factor in producing bread with characteristics considered desirable, and that the best results are obtained when the dough has an intensity of acidity of approximately $pH=5$, which optimum will, however, vary somewhat according to the character of the flour. Consequently as flours more or less freshly milled usually have a lower degree of acid intensity (higher pH on the usual logarithmic scale), it has been the practice of bread makers to add acids in the preparation of bread dough in amounts required for obtaining the optimum intensity of acidity.

I have found that if the hydrogen ion concentration of the flour in a dough is still further increased, for example, to an extent approaching $pH=3$, an effect is produced which though undesirable in the manufacture of bread or other yeast leavened products, is very advantageous in the making of certain bakery products where crispness or brittleness is desired and has heretofore been obtainable, satisfactorily, only by the use of shortening. The increased intensity of acidity over the bread making optimum results in modification of the gluten whereby the oven product will possess the desired degree of crispness or brittleness without the addition of shortening or with a considerable lessening of the amount of shortening used. The shortening effect, so to speak, of augmenting the intensity of acidity of the dough increases progressively up to a certain degree of hydrogen ion concentration, approximately $pH=3$ (which will differ in degree for different flours and doughs having differing ingredients as well as with the character of the acid used) after which, further increase of acid intensity produces a diminishing effect. Where an effect is desired between the bread making optimum and the crest of the hydrogen ion concentration curve it may be obtained by giving the flour or dough an intensity of acidity either greater or less than $pH=3$; but if the intensity is on the down slope of the curve the excess of the treating agent will be wasted.

If the flour is treated before mixing in the dough it may be showered through an atmosphere of air mixed with a suitable agent for acidulating the flour, for example, chlorine gas or hydrochloric acid in a gaseous state; the former method being substantially that heretofore used for the maturing or artificial aging of flour. But to produce the effect sought by my present invention, the amount of the gas used must be increased to the extent necessary to obtain the desired increase in hydrogen ion concentration.

If treatment is reserved until the flour is incorporated in the dough, suitable acids not unwholesome in the amounts used, such as hydrochloric, lactic, phosphoric or acetic, may be added to the dough.

When the flour itself has been treated it may be necessary in order to obtain the desired effect in the finished bakery product, and because the other ingredients of the dough may affect the ultimate acid intensity of the dough, to treat the dough either to increase or decrease its acid intensity. In the first mentioned contingency acid is added and in the latter the acidity may be decreased by neutralization.

It will be obvious from the foregoing that it is not possible to give any specific prescription as to amounts of the treating agents to be used for treatment of the flour either in a dry state or in a dough since that will depend upon a number of variable factors: (1) The natural hydrogen ion concentration of the flour (or that produced artificially by known processes). A patent flour, for example, will have a higher intensity of acidity than a straight flour. The aging of the flour either naturally or artificially will increase H-ion concentration. (2) The character of the dough, the ingredients of which may affect the intensity of acidity to a greater or less degree; (3) the characteristics desired in the finished product which naturally will have to be varied to suit the taste and demands of the consumer; (4) the buffer effect of the flour in respect to which different types and grades of flour differ greatly one from another.

However, it is possible by known methods to ascertain the pH values of flours and of doughs before and after their H-ion concentration has been increased as herein set forth, so that the amount of treating agent may be increased or decreased, as the case may be, in order to obtain the pH aimed at, and hence the desired effect in the finished oven product.

I claim:

1. Treatment of wheat flour to produce a shortening effect which consists in increasing the intensity of acidity of the flour to a point above the optimum intensity for bread making.

2. Treatment of wheat flour to produce a shortening effect which consists in giving the flour an intensity of acidity substantially greater than that represented by $pH=5$.

3. Treatment of wheat flour to produce a shortening effect which consists in giving the flour an intensity of acidity within the range between $pH=5$ and $pH=3$.

4. Method of producing a shortening effect in oven products which consists in increasing the intensity of acidity of the dough above the optimum for bread making.

5. Method of producing a shortening effect in oven products which consists in giving to the dough an intensity of acidity greater than that represented by $pH=5$.

6. Method of producing a shortening effect in oven products which consists in increasing the acidity of the dough to an intensity within the range between $pH=5$ and $pH=3$.

7. Method of producing a bakery product which is short in character, which consists in treating the flour in a dry state with a gaseous agent to increase the intensity of acidity of the flour above the optimum for bread making and modifying the intensity of the acidity of the dough to give the latter an intensity of acidity for producing the desired effect.

8. A wheat flour having an intensity of acidity substantially greater than $pH=5$.

9. A wheat flour having an intensity of acidity within the range between $pH=5$ and $pH=3$.

10. A wheat flour having an intensity of acidity approximately greater than the optimum for bread making.

11. A wheat flour having an intensity of acidity approximating $pH=3$.

12. Wheat flour having an acidity substantially in excess of $pH=5$.

FREDERICK L. DUNLAP.